United States Patent
Lolli et al.

(10) Patent No.: US 7,082,901 B2
(45) Date of Patent: Aug. 1, 2006

(54) METHOD CONTROLLING AN ADJUSTING DEVICE, AND THE CORRESPONDING DEVICE

(75) Inventors: Sergio Lolli, Ascoli Piceno (IT); Richard Komurian, Turckheim (FR); Luc Schwab, Colmar (FR)

(73) Assignee: Mark IV Systemes Moteurs, Courbevoie (FR)

( * ) Notice: Subject to any disclaimer, the term of this patent is extended or adjusted under 35 U.S.C. 154(b) by 0 days.

(21) Appl. No.: 10/499,277

(22) PCT Filed: Dec. 20, 2002

(86) PCT No.: PCT/EP02/14672

§ 371 (c)(1), (2), (4) Date: Nov. 18, 2004

(87) PCT Pub. No.: WO03/054649

PCT Pub. Date: Jul. 3, 2003

(65) Prior Publication Data

US 2005/0126516 A1 Jun. 16, 2005

(30) Foreign Application Priority Data

Dec. 21, 2001 (FR) .................................. 01 16633

(51) Int. Cl.
*F01P 7/14* (2006.01)
(52) U.S. Cl. ................ 123/41.1; 123/41.02; 123/41.13
(58) Field of Classification Search ............... 123/41.1, 123/41.02, 41.13; 137/1
See application file for complete search history.

(56) References Cited

U.S. PATENT DOCUMENTS

| 4,951,224 A | 8/1990 | Hokynar |
| 5,711,507 A | 1/1998 | Berget et al. |

FOREIGN PATENT DOCUMENTS

| DE | 37 26 885 A1 | 2/1989 |
| EP | 0 294 918 A2 | 12/1988 |
| EP | 0 969 190 A1 | 1/2000 |

*Primary Examiner*—Tony M. Argenbright
*Assistant Examiner*—Katrina Harris
(74) *Attorney, Agent, or Firm*—Gottlieb, Rachman&Reisman

(57) ABSTRACT

A method of controlling a device comprising an adjusting component which is associated in its operation with a means for actuating the movable element of said component, a means for sensing the actual position of the movable element and a control means, characterised in that it comprises, at the beginning of any operating cycle, initialising the adjusting device by determining the "fully clsoed" and "open to the maximum" positions of the movable element (1"), and indexing the control means (5) and setting its parameters accordingly then, during the consecutive running of the operating cycle, continuously or at regular intervals putting the open/closed state of the adjusting component (1") under the control of the reference signal (SIGN), by adjusting the control signal (IN) which is applied according to the result of comparing the indicated positions of the movable element (1"), obtained firstly from the reference signal (SIGN) and secondly from the (OUT) signal delivered by the sensing means (4).

14 Claims, 2 Drawing Sheets

Fig_1

METHOD CONTROLLING AN ADJUSTING DEVICE, AND THE CORRESPONDING DEVICE

TECHNICAL FIELD

The invention concerns the field of adjustment of the flow or flow rate of gaseous or liquid fluids circulating, for example, in part of a circuit. Its subject is a method of controlling an adjusting device and a corresponding adjusting device.

BACKGROUND ART

A large number of adjusting devices are already known in which the flow rate of a fluid is controlled by means of a movable element, the position of which determines the cross-section of flow in the device.

These known devices do not however allow precise adjustment, particularly over a long period, as they do not take the actual position of the movable element into account and/or do not allow for the physical changes which affect the mechanical parts of the devices.

In the latter case wear on the packing of the movable element and/or the contact surface of that element will cause the fully closed position of the adjusting device to be shifted, and this will not be taken into account.

Moreover ageing of the materials of the mechanical elements, possible deformation and play of the motion transfer members and possible changes of position between the actuators and the position sensors might cause additional adjustment errors.

These adjustment faults prevent accurate adjustment of the flow even if a high-precision actuator is used. They are particularly prejudicial to devices providing proportional control, where the closed position given by the sensor no longer corresponds to an actual state of total sealing.

Furthermore the majority of known adjusting devices do not check or monitor their state, although such action would probably avert the risks caused by a major fault or malfunctioning and ensure that the devices could be used under normal predetermined conditions.

DISCLOSURE OF INVENTION

The object of the invention is to overcome at least some of the above-mentioned limitations and to provide accurate adjustment over time, especially in cases where it is used for repeated operating cycles, and in addition to be guaranteed to operate under conditions which at least meet minimalist operating criteria.

To this end the first subject of the invention is a method of controlling a device for adjusting the circulation of a gaseous or liquid fluid through an opening or a passage of a pipe during an operating cycle, the device comprising an adjusting component such as a valve which is associated in its operation with a means for controlled actuation of the movable element of said component, with a means for sensing the actual position of the movable element and with a control means connected particularly to the two said means, the control means delivering a control signal to said electrical actuating means particularly according to a reference signal and receiving a signal, transmitted by said sensing means, for positioning the movable element, characterised in that it comprises, at the beginning of any operating cycle, initialising the adjusting device by determining the "fully closed" and "open to the maximum" positions of the movable element, picking up the corresponding signals delivered by the sensing means, and indexing the control means and setting its parameters accordingly then, during the consecutive running of the operating cycle, continuously or at regular intervals putting the open/closed state of the adjusting component under the control of the reference signal, by adjusting the control signal which is applied according to the result of comparing the indicated positions of the movable element, obtained firstly from the reference signal and secondly from the signal delivered by the sensing means.

The second subject of the invention is an adjusting device of the above type, characterised in that the control means comprises a processing unit of the microprocessor type, associated particularly with input/output memory and interfacing circuits and running a control program for each operating cycle, the control program having two consecutive phases, namely a preliminary phase of initialising the actuating means, sensor and control means, and a main consecutive phase for adjusting the control signal IN by means of a control loop which uses the result of comparing the reference signal SIGN with the positioning signal OUT, this latter phase lasting to the end of the operating cycle.

BRIEF DESCRIPTION OF THE DRAWINGS

The invention will be understood better from the following description, which relates to a preferred embodiment given as a non-restrictive example. It will be explained with reference to the accompanying diagrammatic drawings, in which.

BEST MODE FOR CARRYING OUT THE INVENTION

Figure 1:
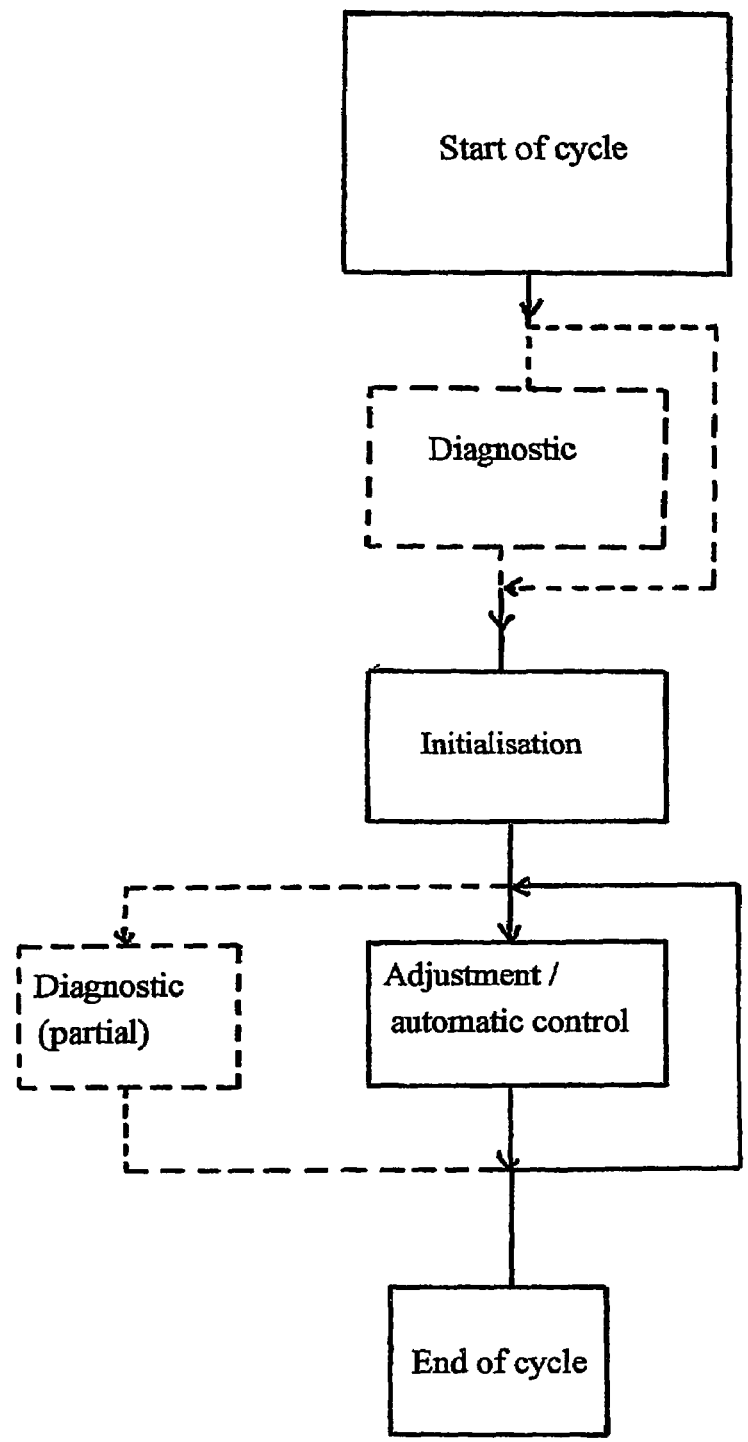
FIG. 1 is a simplified flow chart showing the links between the main stages in the method according to the invention.
Figure 2:
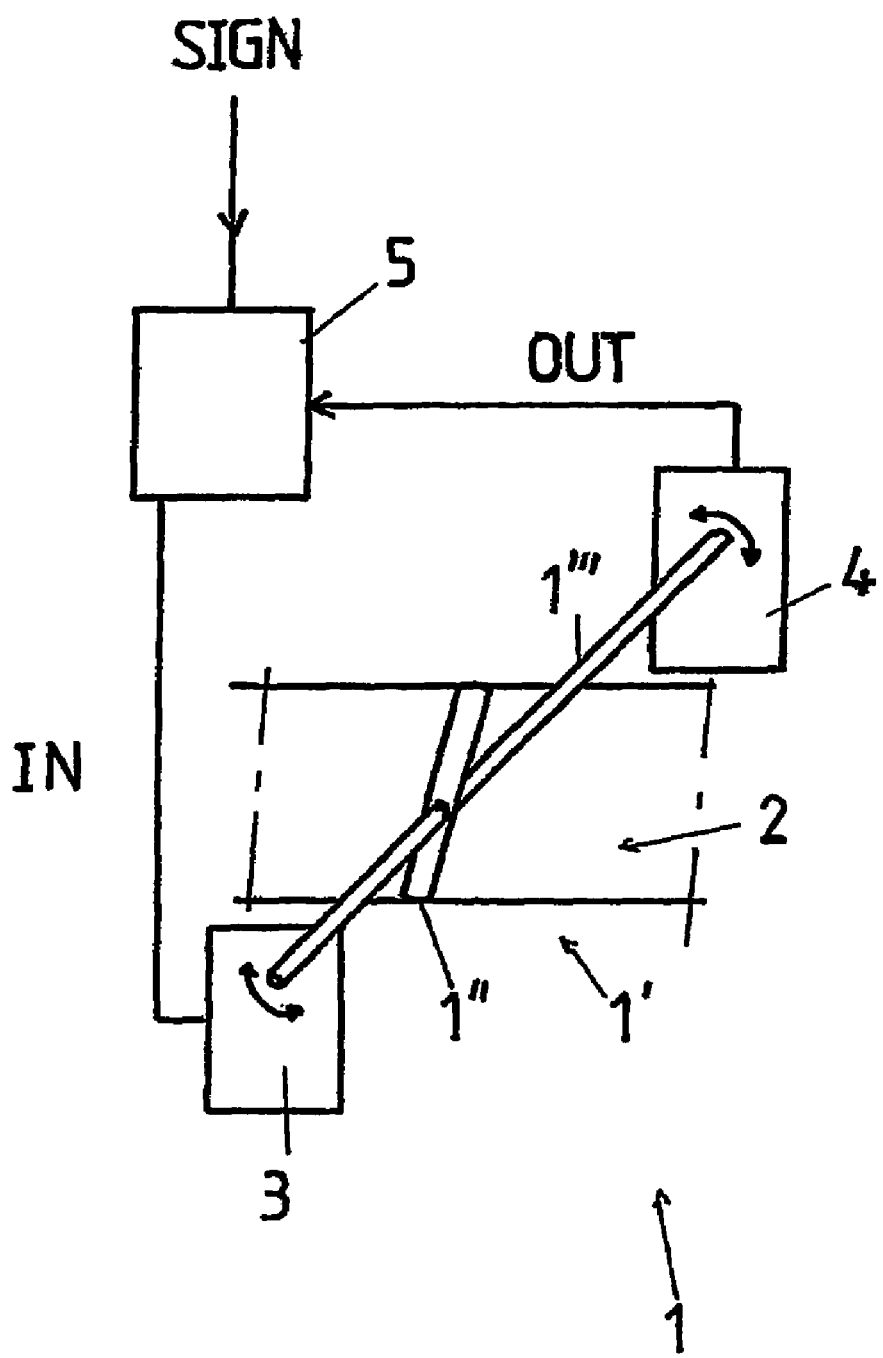
FIG. 2 is a diagrammatic representation of an adjusting device according to the invention.

The method in question applies to a device 1 for adjusting the circulation of a gaseous or liquid fluid through an aperture or a passage 2 through a pipe during an operating cycle.

The device 1 comprises an adjusting component 1' such as a valve which is associated in its operation with a means 3 for controlled actuation of the movable element 1" of said component 1', with a means 4 for sensing the actual position of said movable element 1" and with a control means 5 connected particularly to said two means 3 and 4, the control means 5 providing a control signal IN to said electrical actuating means 3 particularly according to a reference signal SIGN and receiving a signal OUT, transmitted by the sensing means 4, for positioning the movable element 1".

According to the invention the method chiefly comprises, at the beginning of any operating cycle, initialising the adjusting device 1 by determining the "fully closed" and "open to the maximum" positions of the movable element 1", picking up the corresponding OUT signals provided by the sensing means 4, and indexing the control means 5 and setting its parameters accordingly. During the consecutive running of the operating cycle the method then comprises continuously or at regular intervals putting the open/closed state of the adjusting component 1' under the control of the reference signal SIGN, by adjusting the control signal IN, which is applied according to the result of comparing the indicated positions of the movable element 1", obtained firstly from the reference signal SIGN and secondly from the OUT signal delivered by the sensing means 4.

According to a first advantageous feature of the invention the OUT positioning signal of the movable element 1", delivered by the sensing means 4 when the adjusting component 1' is fully closed, is picked up while the movable element 1" is forced into its fully closed position by the electrical actuating means 3. The fully closed position is indicated by the absence of any change in the OUT signal despite the application of an IN signal designed to cause additional displacement of the movable component 1" in the closing direction, and/or by an abnormal change in the electricity consumption of the actuating means, particularly a considerable increase in the current consumed.

The maximum opening position is further determined secondly by displacement of the movable element 1" from its fully closed position to a mechanically, electrically or electronically indexed, shifted position or, if appropriate, corresponding to a maximum measured flow across.

After picking up the levels or values of the signals delivered by the sensing means 4 in the fully closed and maximum opening position respectively the control means 5, knowing the geometrical characteristics of the component 1 and element 1", can easily establish a corresponding relationship, for example of the proportional type (with or without an initial shift), between the actual position of the movable element 1" and the level or value of the signal delivered by the sensing means 4 (according to the type of signal).

To ensure that the adjusting device 1 operates reliably the method may also comprise, before the initialisation phase, carrying out diagnostic, checking the actuating means 3, sensing means 4 and, if appropriate, the control means 5, and either permitting running of the initialisation phase in the absence of any failure or malfunctioning, or allowing the control means to emit a warning signal or alarm (a sound or light warning to the user or operator) should failure and/or malfunctioning be detected.

The diagnostic operations will preferably comprise a plurality of tests on the supply and operation of the adjusting device 1, selected from the following group:

- comparing the supply voltage with a predetermined low threshold value and, if appropriate, a predetermined high threshold value,
- comparing the level of the OUT positioning signal with a predetermined low threshold value and a predetermined high threshold value (possibly detecting a supply failure or abnormal positioning of the movable element 1"),
- comparing the current consumed or the increase in current consumed by the electric actuating means with a high threshold value (possible malfunctioning, breakdown or failure),
- detecting displacement of the movable element 1" following application of an IN control signal or a change in that signal (possible blockage of the means 3 or movable element 1") and
- comparing the directions in which the IN control signal and OUT positioning signal change (possible mounting or connection fault).

The above-mentioned threshold values used for comparison will of course depend on the characteristics of the available supply (supply voltage) and the optimal operating characteristics known for the actuating means and sensor.

In order to restrict the risks of malfunctioning and damage to the adjusting device 1 still further, at least some of the diagnostic and checking operations are repeated at regular intervals throughout the operating cycle.

Typical running of the control process during an operating cycle is shown diagrammatically in FIG. 1, the optional stages of initial diagnostic and partial repeat diagnostic during the cycle being indicated in dotted lines.

In a particularly advantageous application of the invention the afore-mentioned operating cycle corresponds to an operating cycle of a motor vehicle, covering the time between starting and consecutive stopping of the latter. The adjusting component 1 is incorporated in a fluid-circulating circuit 6 of such a vehicle, the various operating stages being carried out during each successive operating cycle.

In a preferred embodiment the adjusting component 1 is part of the cooling circuit 6 associated with said motor.

In the context of the above-mentioned advantageous application the stages in the process will commence as soon as the vehicle's electric contact is made for starting. The initialisation phase will be completed before the engine is actually started or no more than a few seconds after starting.

Finally, in a preferred embodiment of the invention which particularly produces an inexpensive structure, the adjusting component 1 comprises a flap gate or rotary butterfly valve 1" mounted on a spindle 1'''. The actuating means 3 comprises a d.c. motor and the sensing means 4 comprises a potentiometer, these two last means being mounted stably for rotation on said spindle 1'''.

The adjusting component 1' may, for example, be constructed as described and shown in French patent application no. 2 805 878 of 1 Mar. 2000 or French patent application no. 01 15738 of 5 Dec. 2001 in the Applicants' name. The contents of the two documents are included in this specification by reference.

As previously mentioned, the invention also concerns an adjusting device 1 comprising a component 1' for adjusting the circulation of a fluid through an aperture or in a passage 2 through a pipe, a means 3 for actuating the movable element 1" of said component 1', a sensing means 4 for detecting the actual position of the movable element 1" and a control means 5. The latter delivers a control signal IN to the actuating means 3 particularly according to a reference signal SIGN and receives a signal OUT, transmitted by the sensing means 4, for positioning the movable element 1".

In accordance with the invention the control means 5 comprises a processing unit of the microprocessor type, associated particularly with input/output memory and interfacing circuits and running a control program for every operating cycle. The control program has two consecutive phases, namely a preliminary phase for initialising the actuating means 3, sensor 4 and control means 5, and a main consecutive phase for adjusting the control signal IN by means of a control loop which uses the result of comparing the reference signal SIGN with the positioning signal OUT. This latter phase lasts to the end of the operating cycle.

The control means 5 may either be entirely dedicated to the adjusting function and thus to controlling the device 1, or it could also carry out other functions, even controlling the operation of a whole unit of which the device is only a part.

According to one feature of the invention the control loop includes a PDI-type adjuster in the control means 5 (PDI=proportional to the derivative integral). This may be located near the device 1 or an integral part of its structure, or it may be remote, forming an integral part of a general adjusting system.

The adjusting component 1' advantageously comprises a rotary butterfly valve 1" mounted on a spindle 1''', the actuating means 3 comprising a d.c. motor and the sensing means 4 comprising a potentiometer, these two latter means being fixed to the spindle 1''' for rotation therewith.

In a preferred embodiment the adjusting component 1' is part of the cooling circuit 6 associated with the thermal or internal-combustion engine of a vehicle.

The adjusting device 1 is advantageously suitable for carrying out the method described above, and further comprises means for carrying out the preliminary and normal diagnostic operations previously described.

The invention also concerns a circuit for circulating a fluid, particularly a liquid, in a vehicle with an internal-combustion engine, characterised in that it has at least one adjusting device of the type mentioned above.

The invention is not of course limited to the embodiment described and shown in the accompanying drawings. Changes can be made, particularly in respect of the structure of the various members or by substituting equivalent techniques, without thereby going beyond the scope of protection of the invention.

The invention claimed is:

1. A method of controlling a device for adjusting the circulation of a gaseous or liquid fluid through an opening or a passage through a pipe during an operating cycle, the device comprising an adjusting component such as a valve which is associated in its operation with a means for controlled actuation of the movable element of said component, with a means for sensing the actual position of said movable element and with a control means connected particularly to the two said means, the control means delivering a control signal (IN) to said electrical actuating means particularly according to a reference signal (SIGN) and receiving a signal (OUT); transmitting by said sensing means, for positioning the movable element, initializing the adjusting device by determining the "fully closed" and "open to the maximum" positions of the movable element (1") at the beginning of any operating cycle, picking up the corresponding (OUT) signals delivered by the sensing means (4), and indexing the control means (5) and setting its parameters accordingly then, during the consecutive running of the operating cycle, continuously or at regular intervals putting the open/closed state if the adjusting component (1') under the control of the reference signal (SIGN), by adjusting the control signal (IN) which is applied according to the result of comparing the indicated positions of the movable element (1"), obtained firstly from the reference signal (SIGN) and secondly from the signal (OUT) delivered by the sensing means (4), the method characterized in that the (OUT) positioning signal of the movable element (1"), delivered by the sensing means (4) when the adjusting component (1') is fully closed, is picked up while the movable element (1") is forced into its fully closed position by the electrical actuating means (3), the fully closed position being indicated by the absence of any change in the (OUT) signal despite the application of an (IN) signal designed to cause additional displacement of the movable component (1") in the closing direction, and/or by an abnormal change in the electricity consumption of the actuating means, particularly a considerable increase in the current consumption.

2. The method of claim 1 characterized in that the maximum opening position is determined by displacement of the movable element (1") from its fully closed position to a mechanically, electrically or electronically indexed, shifted position or a position corresponding to a maximum measure flow passing through.

3. The method of claim 1, characterized in that it comprises, before the initialization phase, carrying out operations of diagnostic and checking the status of the actuating means (3), sensing means (4) and, if appropriate, the control means (5), and either permitting running of the initialization phase in the absence of any failure or malfunctioning, or allowing the control means to emit a warning or alarm signal should failure and/or malfunctioning be detected.

4. The method of claim 3, characterized in that the diagnostic and checking operations comprise a plurality of testes on the supply and operation of the adjusting device (1), selected from the group consisting of:
comparing the supply voltage with a predetermined low threshold value and, if appropriate, a predetermined high threshold value,
comparing the level of the (OUT) positioning signal with a predetermined low threshold value and a predetermined high threshold
comparing the current consumed or increase in current consumed by electric actuating means with a high threshold value,
detecting displacement of the movable element (1") following application of an (IN) control signal or a change in that signal, and
comparing the direction in which the (IN) control signal and (OUT) positioning signal change.

5. The method of claim 3, characterized in that at least some of the diagnostic and checking operations are repeated at regular intervals throughout the operating cycle.

6. A method of controlling a device for adjusting the circulation of a gaseous or liquid fluid through an opening or a passage through a pipe during an operating cycle, the device comprising an adjusting component such as a valve which is associated in its operation with a means for controlled actuation of the movable element of said component, with a means for sensing the actual position of said movable element and with a control means connected particularly to the two said means, the control means delivering a control signal (IN) to said electrical actuating means particularly according to a reference signal (SIGN) and receiving a signal (OUT); transmitting by said sensing means, for positioning the movable element, initializing the adjusting device by determining the "fully closed" and "open to the maximum" positions of the movable element (1") at the beginning of any operating cycle, picking up the corresponding (OUT) signals delivered by the sensing means (4), and indexing the control means (5) and setting its parameters accordingly then, during the consecutive running of the operating cycle, continuously or at regular intervals putting the open/closed state if the adjusting component (1') under the control of the reference signal (SIGN), by adjusting the control signal (IN) which is applied according to the result of comparing the indicated positions of the movable element (1"), obtained firstly from the reference signal (SIGN) and secondly from the signal (OUT) delivered by the sensing means (4), the method characterized in that the operating cycle corresponds to an operating cycle of a motor vehicle, covering the time between starting and consecutive stopping of the latter, and the adjusting component (1) is incorporated in a circuit (6) for circulating a fluid of such a vehicle, the various operating stages being carried out for each fresh operating cycle.

7. The method of claim 6, characterized in that the adjusting component (1) is part of the cooling circuit (6) associated with said motor.

8. The method of claim 6, characterized in that if it commences as soon as the vehicle's electric contact is made for starting, the initialization phase being completed before the engine is actually started or a few seconds after starting at the latest.

9. The method of claim 6, characterized in that the adjusting component (1') comprises a flap gate or rotary butterfly valve (1") mounted on a spindle (1"), the actuating means (3) comprising a d.c. motor and the sensing means (4) comprising a potentiometer, these two last means being mounted rigidly for rotation on said spindle (1").

10. An adjusting device comprising a component for adjusting the circulation of a fluid through an aperture or in a passage of a pipe, a means for actuating the movable element of said component, a sensing means for detecting the actual position of the movable element and a control means, the latter delivering a control signal (IN) to the actuating means particularly according to a reference signal (SIGN) and receiving a signal (OUT), transmitted by the sensing means, for positioning the movable element, the control means (5) comprising a processing unit of the microprocessor type, associated particularly with input/output memory and interfacing circuits and running a control program for each operating cycle, the control program having two consecutive phases, namely a preliminary phase for initializing the actuating means (3), sensor (4) and control means (5), and a main consecutive phase for adjusting the control signal (IN) by means of a control loop which uses the result of comparing the reference signal (SIGN) with the positioning signal (OUT), this latter phase lasting the end of the operating cycle, the adjusting device characterized in that the adjusting component (1') is part of the cooling circuit (6) associated with the engine of a vehicle with a thermal or internal-combustion engine.

11. The adjusting device of claim 10 characterized in that the control loop includes an adjuster of the "proportional to the derived integral" type in the control means (5).

12. The adjusting device of claim 10, characterized in that the adjusting component (1') comprises a rotary butterfly valve (1") mounted on a spindle (1"), the actuating means (3) comprising a d.c. motor and the sensing means (4) comprising a potentiometer, these two latter means being fixed to the spindle (1") for rotation therewith.

13. The adjusting device of claim 10, characterized in that it further comprises means for carrying out diagnostic operations.

14. A circuit for circulating fluid, particularly a liquid, in a motor vehicle with an internal combustion engine, characterized in that it has at least one adjusting device according to claim 10.

* * * * *

UNITED STATES PATENT AND TRADEMARK OFFICE
CERTIFICATE OF CORRECTION

PATENT NO. : 7,082,901 B2 Page 1 of 1
APPLICATION NO. : 10/499277
DATED : August 1, 2006
INVENTOR(S) : Sergio Lolli et al.

It is certified that error appears in the above-identified patent and that said Letters Patent is hereby corrected as shown below:

Title page, item (54):

Change "METHOD CONTROLLING AN ADJUSTING DEVICE, AND THE CORRESPONDING DEVICE" to -- METHOD OF CONTROLLING AN ADJUSTING DEVICE, AND THE CORRESPONDING DEVICE --.

Title page, item (73):

Change "Mark IV Systemes Moteurs" to -- Mark IV Systemes Moteurs (Société Anonyme) --.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,082,901 B2 |
| APPLICATION NO. | : 10/499277 |
| DATED | : August 1, 2006 |
| INVENTOR(S) | : Sergio Lolli et al. |

It is certified that error appears in the above-identified patent and that said Letters Patent is hereby corrected as shown below:

Title page, item (54) and Column 1, lines 1-3:

Change "METHOD CONTROLLING AN ADJUSTING DEVICE, AND THE CORRESPONDING DEVICE" to -- METHOD OF CONTROLLING AN ADJUSTING DEVICE, AND THE CORRESPONDING DEVICE --.

Title page, item (73):

Change "Mark IV Systemes Moteurs" to -- Mark IV Systemes Moteurs (Société Anonyme) --.

This certificate supersedes the Certificate of Correction issued August 19, 2008.

Signed and Sealed this

Sixteenth Day of September, 2008

JON W. DUDAS
*Director of the United States Patent and Trademark Office*